(12) United States Patent
Schweinert

(10) Patent No.: US 11,394,262 B2
(45) Date of Patent: Jul. 19, 2022

(54) WINDING PIECE AND ELECTRIC MACHINE HAVING SUCH A WINDING PIECE

(71) Applicant: dynamic E flow GmbH, Kaufbeuren (DE)

(72) Inventor: Nikolaus Schweinert, Kaufbeuren (DE)

(73) Assignee: DYNAMIC E FLOW GMBH, Kaufbeuren (DE)

( * ) Notice: Subject to any disclaimer, the term of this patent is extended or adjusted under 35 U.S.C. 154(b) by 221 days.

(21) Appl. No.: 16/641,009

(22) PCT Filed: Aug. 14, 2018

(86) PCT No.: PCT/EP2018/072025
§ 371 (c)(1),
(2) Date: Feb. 21, 2020

(87) PCT Pub. No.: WO2019/038139
PCT Pub. Date: Feb. 28, 2019

(65) Prior Publication Data
US 2021/0091619 A1    Mar. 25, 2021

(30) Foreign Application Priority Data
Aug. 21, 2017    (DE) .................... 10 2017 119 033.3

(51) Int. Cl.
*H02K 3/12*    (2006.01)
*H02K 3/02*    (2006.01)
(Continued)

(52) U.S. Cl.
CPC ................ *H02K 3/12* (2013.01); *H02K 3/02* (2013.01); *H02K 3/22* (2013.01); *H02K 3/24* (2013.01);
(Continued)

(58) Field of Classification Search
CPC .. H02K 3/12; H02K 3/02; H02K 3/22; H02K 3/24; H02K 3/28; H02K 3/48; H02K 3/50; H02K 2203/06; H02K 9/19
(Continued)

(56) References Cited

U.S. PATENT DOCUMENTS 2,897,382 A * 7/1959 Hamill ..................... H02K 3/22
                                                      310/64
3,014,139 A * 12/1961 Shildneck ............... H02K 3/22
                                                      310/64
(Continued)

FOREIGN PATENT DOCUMENTS

DE    1128541 B      4/1962
DE    69830869 T2    5/2006
(Continued)

OTHER PUBLICATIONS

Chinese Office Action for application No. 201880054428 dated Jun. 30, 2021 with English Translation.
(Continued)

*Primary Examiner* — Ahmed Elnakib
(74) *Attorney, Agent, or Firm* — Carter, DeLuca & Farrell LLP

(57) ABSTRACT

The invention relates to a winding piece (1), in particular in the shape of a hairpin, which is provided to be inserted into the grooves (7) of an electrical machine, comprising two limbs (2) and a curved transition region (3), which connects the two limbs (2) to each other. According to the invention, the limbs (2) each have a first portion (4) having a profile, which is adjusted to the cross-section of the groove (7), and an end portion (5), which has a round profile, wherein the winding piece (1) is formed as a hollow conductor, which has a penetrating channel (9), through which a coolant can be led.

7 Claims, 3 Drawing Sheets

(51) Int. Cl.
*H02K 3/22* (2006.01)
*H02K 3/24* (2006.01)
*H02K 3/28* (2006.01)
*H02K 3/48* (2006.01)
*H02K 3/50* (2006.01)

(52) U.S. Cl.
CPC ............... *H02K 3/28* (2013.01); *H02K 3/48* (2013.01); *H02K 3/50* (2013.01); *H02K 2203/06* (2013.01)

(58) Field of Classification Search
USPC .......................................... 310/54, 179–208
See application file for complete search history.

(56) References Cited

U.S. PATENT DOCUMENTS

| | | | | |
|---|---|---|---|---|
| 3,052,746 A | * | 9/1962 | Wolff | H02K 3/22 |
| | | | | 174/8 |
| 3,652,882 A | * | 3/1972 | Elliott | H02K 3/22 |
| | | | | 310/61 |
| 6,476,530 B1 | * | 11/2002 | Nakamura | H02K 3/12 |
| | | | | 310/201 |
| 9,515,530 B2 | * | 12/2016 | Ho | H02K 9/227 |
| 2017/0126084 A1 | * | 5/2017 | Schweinert | H02K 3/22 |
| 2021/0091619 A1 | * | 3/2021 | Schweinert | H02K 3/24 |

FOREIGN PATENT DOCUMENTS

| | | |
|---|---|---|
| EP | 1168571 A2 | 1/2002 |
| GB | 1179553 A | 1/1970 |
| GB | 2202170 A | 9/1988 |
| JP | 2013208038 A | 10/2013 |
| WO | 2015150556 A1 | 10/2015 |
| WO | 2016189192 A1 | 12/2016 |

OTHER PUBLICATIONS

International Search Report and Written Opinion (including English translations) issued in corresponding PCT/EP2018/072025 dated Jul. 11, 2018, 16 pages.

Second Chinese Office Action for application No. 201880054428.0 dated Mar. 21, 2022 with English translation.

* cited by examiner

WINDING PIECE AND ELECTRIC MACHINE HAVING SUCH A WINDING PIECE

The invention relates to a winding piece, in particular in the form of a hairpin, which is provided to be inserted into the groove of an electromotor, as well as an electrical machine having such winding pieces.

BACKGROUND TO THE INVENTION

Internally cooled electrical machines having a winding are known from the prior art, said winding being produced from an electrically conductive hollow wire. The hollow wire is usually a round wire having a channel penetrating in the longitudinal direction, through which a coolant can be led in order to cool the electrical machine. As a result, the nominal power of such electrical machines can increase considerably in comparison to conventional electrical machines. A typical internally cooled electromotor having a hollow wire winding is known, for example, from WO 2015/150556 A9.

Along with electrical machines having a winding made of a round wire, there are also electrical machines whose winding is produced by so-called pin or hairpin technology. Pins or hairpins are generally rigid winding pieces made of copper, which are inserted into the grooves of an electrical machine. In the inserted state, a piece of the pins or hairpins protrudes from the grooves on the head side of the stator. The protruding ends are then usually interlocked and welded to one another, such that a complete coil emerges.

Pins known from the prior art are generally rod-shaped, rigid elements, which have a rectangular profile. In general, hairpins comprise two limbs and a curved transition region which connects the two limbs to each other. The limbs have a rectangular profile, which is adjusted to the cross-section of the groove.

An electromotor having a winding piece, which is provided to be inserted into a groove of the electromotor, is known, for example, from GB 1 179 553 A, U.S. Pat. No. 9,515,530 B2 or DE 11 28 541 A. However, the connection of several such winding pieces to form a whole winding is technically relatively difficult.

OBJECT OF THE PRESENT INVENTION

It is thus the object of the present invention to create a winding piece with which an internally cooled winding for an electrical machine can be simply produced. Moreover, it is an object of the invention to create an internally cooled electrical machine, which has a winding having several such winding pieces.

This object is solved according to the invention by the features mentioned in the independent claims. Further developments of the invention emerge from the subordinate claims.

According to the invention, a winding piece is proposed which has a first portion having a first profile, which is adjusted to the cross-section of a groove of an electrical machine, and two end portions, which each have a second, in particular round, profile. The winding piece according to the invention is furthermore formed as a hollow conductor having a penetrating channel, through which a coolant can be led. Because of the specific profile of the end portions, the winding pieces can be hydraulically connected to one another in a substantially simpler manner. Moreover, it is thus possible to solder a connection element required for this onto the ends.

According to a preferred embodiment of the invention, the ends of the winding piece each have a round profile.

The winding piece can have the shape of a rod, for example.

According to another embodiment of the invention, the winding piece has the shape of a hairpin, wherein the winding piece comprises two limbs and a curved transition region, which connects the two limbs to one another. Each of the limbs comprises a first portion having a profile, which is adjusted to the cross-section of the corresponding groove, and an end portion, which has a round profile. The ends of the individual winding pieces can thus be mechanically and hydraulically connected to other winding pieces in a substantially simpler manner via connection elements. The winding piece according to the invention is furthermore formed as a hollow conductor, which has a penetrating channel through which a coolant can be led.

A winding piece according to the invention can be dimensioned, in principle, in such a way that it occupies a groove alone or together with one or more further winding pieces, which are arranged in the same groove. In the case of one single winding piece per groove, the profile of the (first) portion running in the groove is preferably designed in such a way that the portion lies in the groove substantially without clearance. In the case of several winding pieces per groove, the profile of the portions running in the groove is preferably designed in such a way that all winding pieces together occupy the groove substantially without clearance.

According to a preferred embodiment of the invention, preferably, the first portion has or the limbs have a rectangular, in particular quadratic, profile on their first portion, said profile being adjusted to the inner cross-section of the corresponding groove.

A winding piece according to the invention is preferably produced from copper, aluminum or an alloy of one of said materials.

The winding piece according to the invention is provided with an electrically insulating layer on its outer surface.

The invention also relates to an electrical machine having an electrical winding for generating an electromagnetic field, which comprises several of the winding pieces mentioned above. Here, several of the winding pieces are electrically connected to one another to form a coil.

The electrical machine according to the invention preferably also comprises several tubular connection elements, which are arranged on the open ends of the winding pieces, in order to fluidically technically connect the winding pieces to one another. The connection elements are preferably formed to be tubular and each have a round inner cross-section on their two ends which is dimensioned in such a way that the connection elements can each be attached onto the round end portions of the winding pieces.

The connection elements according to the invention are preferably curved in an arc shape and can be formed, for example, to be horseshoe-shaped or U-shaped.

According to another embodiment of the invention, a connection element can also be provided that connects more than two winding pieces to one another. Such a connection element preferably comprises ports for more than two winding pieces. According to a specific embodiment of the invention, the connection element can have an internal collection or distribution channel which is connected to more than two winding pieces. Such a connection element having a collection or distribution channel can be dimensioned in such a way that all winding pieces of an electrical machine can be attached thereto.

BRIEF DESCRIPTION OF THE DRAWINGS

The invention is explained in more detail below by way of example by means of the attached drawings.

EMBODIMENTS OF THE INVENTION

Figure 1:
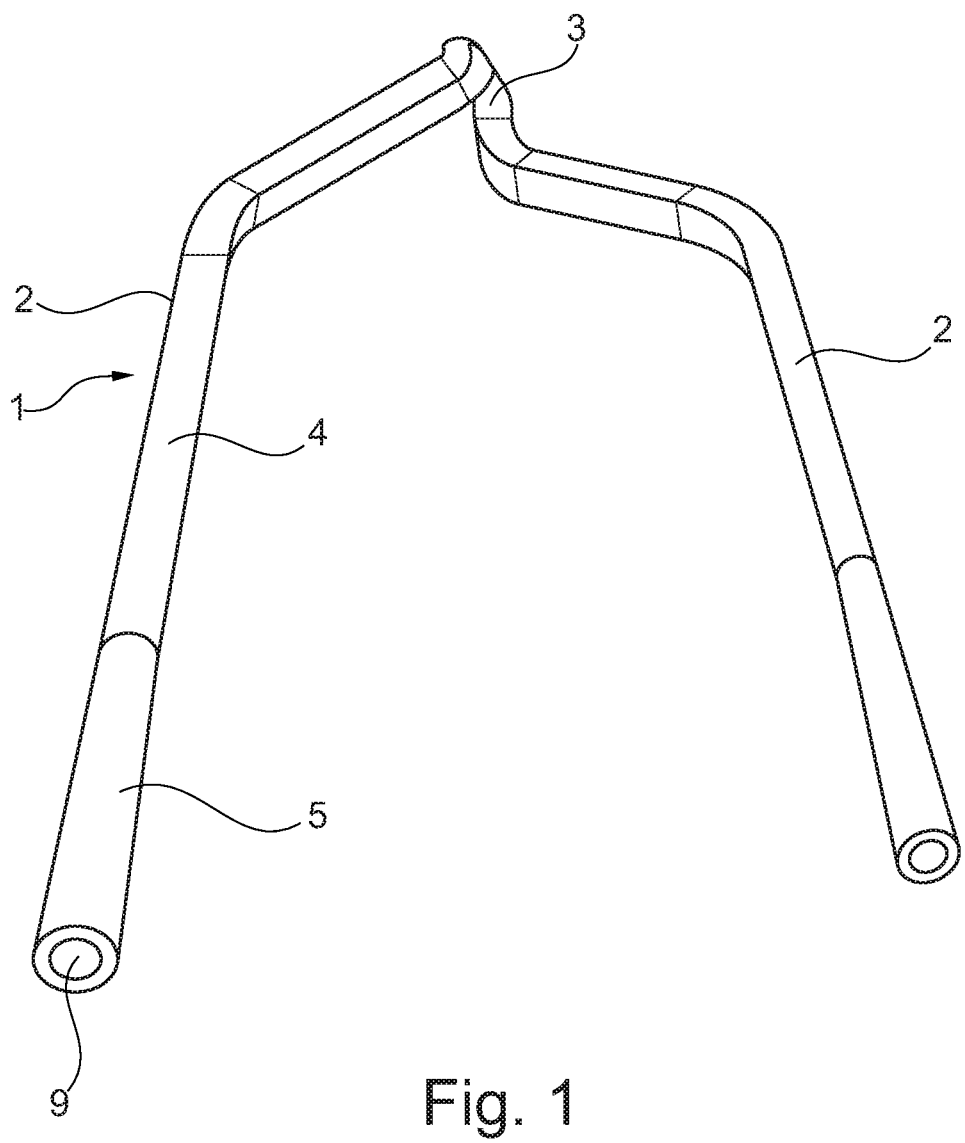
FIG. 1 a perspective view of a winding piece for an electrical machine in the form of a hairpin.

FIG. 1 shows a perspective view of a winding piece in the shape of a hairpin for the winding of an electrical machine. Such winding pieces 1 are also referred to as hairpins since they have the shape of a hairpin.

In order to produce an electromagnetic winding of an electrical machine, several hairpins are inserted into the grooves of a stator of the electrical machine and are electrically connected to one another in order to form one or more coils.

The winding piece 1 depicted in FIG. 1 comprises two limbs 2 and a curved transition region 3, which connects the two limbs 2 to each other. Here, the limbs 2 each have a first portion 4 having a profile, which is adjusted to the cross-section of the grooves of the electrical machine, such that they are arranged in the relevant groove in a substantially clearance free manner. The profile of the first portion 4 of the limbs 2 is substantially quadratic in the exemplary embodiment depicted, yet could also be rectangular, for example, or have a different shape. The limbs 2 each have a round profile on their free end portions 5. This has the advantage that the end portions 5 can be fluidically technically connected to one another simply and securely via tubular connection elements 6, as they are depicted in FIG. 2 by way of example.

The hairpin-shaped connection piece 1 from FIG. 1 further comprises a penetrating channel 9 through which a coolant can be led in order to cool the winding of the electrical machine during operation.

The winding piece 1 depicted in FIG. 1 can be produced, for example, from copper. It is preferably provided with an electrically insulating layer on its outer surface.

Figure 2:
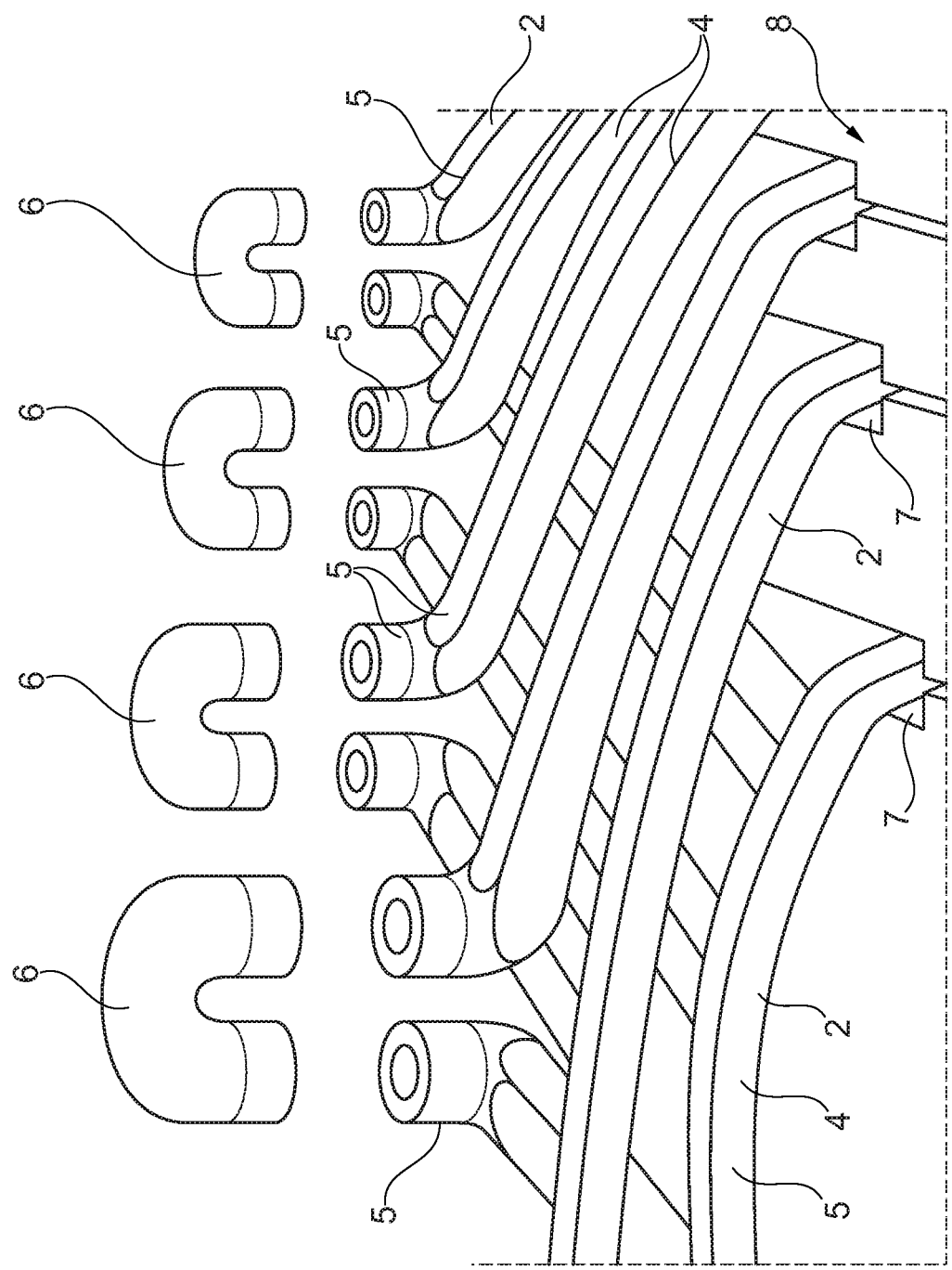
FIG. 2 a detailed view of a stator of an electrical machine having several winding pieces in the shape of hairpins.

FIG. 2 shows an enlarged view of a head portion of a stator 8, wherein the end portions 5, which protrude from the grooves 7, of the winding pieces 1 can be seen very clearly.

In order to obtain a closed coolant circuit, the free ends or end portions 5 of the winding pieces 1 are hydraulically connected to one another via several tubular connection elements 6. The connection elements 6 are formed to be U-shaped in the depicted exemplary embodiment and each have a round inner diameter on their open ends, such that they can be attached onto the round end portions 5 of the winding pieces 1. The round design here has the advantage that the connection elements 6 can be attached in any alignment, whereby the process can be automated relatively easily.

Figure 3:
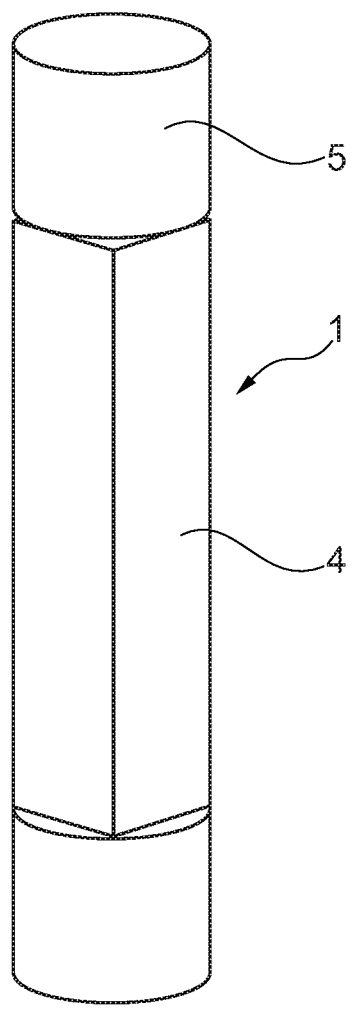
FIG. 3 a view of a rod-shaped winding piece for an electrical machine.

Finally, FIG. 3 shows another view of a rod-shaped winding piece 1 for an electrical machine. The rod-shaped winding piece 1 in turn has a central portion 4 having a rectangular profile and two end portions 5 having a round profile.

Note: The project that led to this application was carried out as part of the Horizon 2020 subsidy program for research and innovation of the EU as part of grant agreement no. 804219.

The invention claimed is:

1. A winding piece that is provided to be inserted into one or more grooves of an electrical machine, wherein the winding piece is formed as a hollow conductor having a continuous channel, through which a coolant can be led, wherein the winding piece has a first portion having a rectangular profile and two end portions having a round profile.

2. The winding piece of claim 1, wherein the winding piece is formed in the shape of a hairpin.

3. The winding piece according to claim 1, wherein the winding piece is produced from copper, aluminum or an alloy of copper and aluminum.

4. The electrical machine of claim 1 having an electrical winding for generating an electromagnetic field, wherein the electrical winding comprises several winding pieces.

5. The electrical machine according to claim 4, wherein the winding pieces are connected to one another via one or more connection elements.

6. The electrical machine according to claim 5, wherein the connection elements are formed to be tubular and each connection element has a round inner cross-section on two ends thereof which is adjusted to the round profile of the two end portions of the winding pieces.

7. The electrical machine according to claim 5, wherein the connection elements are curved in the shape of arcs.

* * * * *